United States Patent [19]
Gotoh

[11] Patent Number: 5,522,363
[45] Date of Patent: Jun. 4, 1996

[54] DIAGNOSTIC SYSTEM FOR IDLE SPEED CONTROL VALVE

[75] Inventor: Kenichi Gotoh, Zama, Japan

[73] Assignee: Nissan Motor Co., Ltd., Yokohama, Japan

[21] Appl. No.: 327,497

[22] Filed: Oct. 21, 1994

[30] Foreign Application Priority Data

Nov. 10, 1993 [JP] Japan ................................ 5-281403

[51] Int. Cl.$^6$ ................................................ F02D 41/22
[52] U.S. Cl. ................................ 123/339.15; 73/118.1
[58] Field of Search ................ 123/339.15; 73/118.1, 73/118.2

[56] References Cited

U.S. PATENT DOCUMENTS 5,408,871  4/1995  Lieder et al. .................... 73/118.1

FOREIGN PATENT DOCUMENTS

63-177648  11/1988  Japan .

*Primary Examiner*—Tony M. Argenbright
*Attorney, Agent, or Firm*—Foley & Lardner

[57]  ABSTRACT

A diagnostic system for an idle speed control valve is constructed to determine abnormality of the idle speed control valve by detecting a variation in an intake air amount produced upon forced opening and closing operation of the idle speed control valve.

4 Claims, 5 Drawing Sheets

NORMAL STATE

FIG.6B

FIXED STATE

FIG.7

DIAGNOSTIC SYSTEM FOR IDLE SPEED CONTROL VALVE

BACKGROUND OF THE INVENTION

The present invention relates to a diagnostic system for an idle speed control valve arranged to an engine.

An automotive engine is provided with an idle speed control valve for adjusting an amount of auxiliary intake air which flows in bypassing an intake throttle valve, thus automatically setting the idle speed to a predetermined value.

If the idle speed control valve has a failure, etc., the idle speed is reduced to cause unstable operability of the engine, or inversely the idle speed is increased to cause deteriorated fuel consumption, etc. Thus, the abnormality diagnosis of the idle speed control valve is needed.

One of conventional diagnostic systems for an idle speed control valve is disclosed, for example, in JP-U 63-177648, which is constructed to detect a variation in the engine speed with a variation in the opening degree of the idle speed control valve, and determine abnormality of the idle speed control valve when a variation in the engine speed is smaller than a predetermined value.

As to such conventional diagnostic system for an idle speed control valve, however, since the engine speed can vary due to a factor other than malfunction of the idle speed control valve, it is difficult to correctly determine abnormality of the idle speed control valve.

It is, therefore, an object of the present invention to provide a diagnostic system for an idle speed control valve which allows correct diagnosis of abnormality of the idle speed control valve.

SUMMARY OF THE INVENTION

According to one aspect of the present invention, there is provided a diagnostic system for an idle speed control valve of an engine, the idle speed control valve adjusting an amount of auxiliary intake air which flows in bypassing an intake throttle valve, the diagnostic system comprising:

means for detecting an engine speed;

means for detecting an idle operation of the engine; and a microcomputer based control unit connected to the idle speed control valve, said engine speed detecting means and said idle operation detecting means, said microcomputer based control unit controlling in a feedback way an opening degree of the idle speed control valve so as to approach an idle speed of the engine to a target value, said microcomputer based control unit including:

means for determining a diagnostic area wherein diagnosis permission conditions are established;

means for forcibly producing a variation in said opening degree of the idle speed control valve in a predetermined mode in said diagnostic area determined;

means for detecting a variation in an amount of intake air with said variation in said opening degree of the idle speed control valve produced; and means for determining abnormality of the idle speed control valve when said variation in said amount of intake air detected is smaller than a predetermined value.

According to another aspect of the present invention, there is provided, in an engine having an intake throttle valve:

an idle speed control valve arranged to adjust an amount of auxiliary intake air which flows in bypassing the intake throttle valve;

means for detecting an engine speed;

means for detecting an idle operation of the engine; and a microcomputer based control unit connected to said idle speed control valve, said engine speed detecting means and said idle operation detecting means, said microcomputer based control unit controlling in a feedback way an opening degree of said idle speed control valve so as to approach an idle speed of the engine to a target value, said microcomputer based control unit including:

means for determining a diagnostic area wherein diagnosis permission conditions are established;

means for forcibly producing a variation in said opening degree of said idle speed control valve in a predetermined mode in said diagnostic area determined;

means for detecting a variation in an amount of intake air with said variation in said opening degree of said idle speed control valve produced; and means for determining abnormality of said idle speed control valve when said variation in said amount of intake air detected is smaller than a predetermined value.

DETAILED DESCRIPTION OF THE INVENTION

Referring to the drawings, a preferred embodiment of the present invention will be described.

Figure 1:
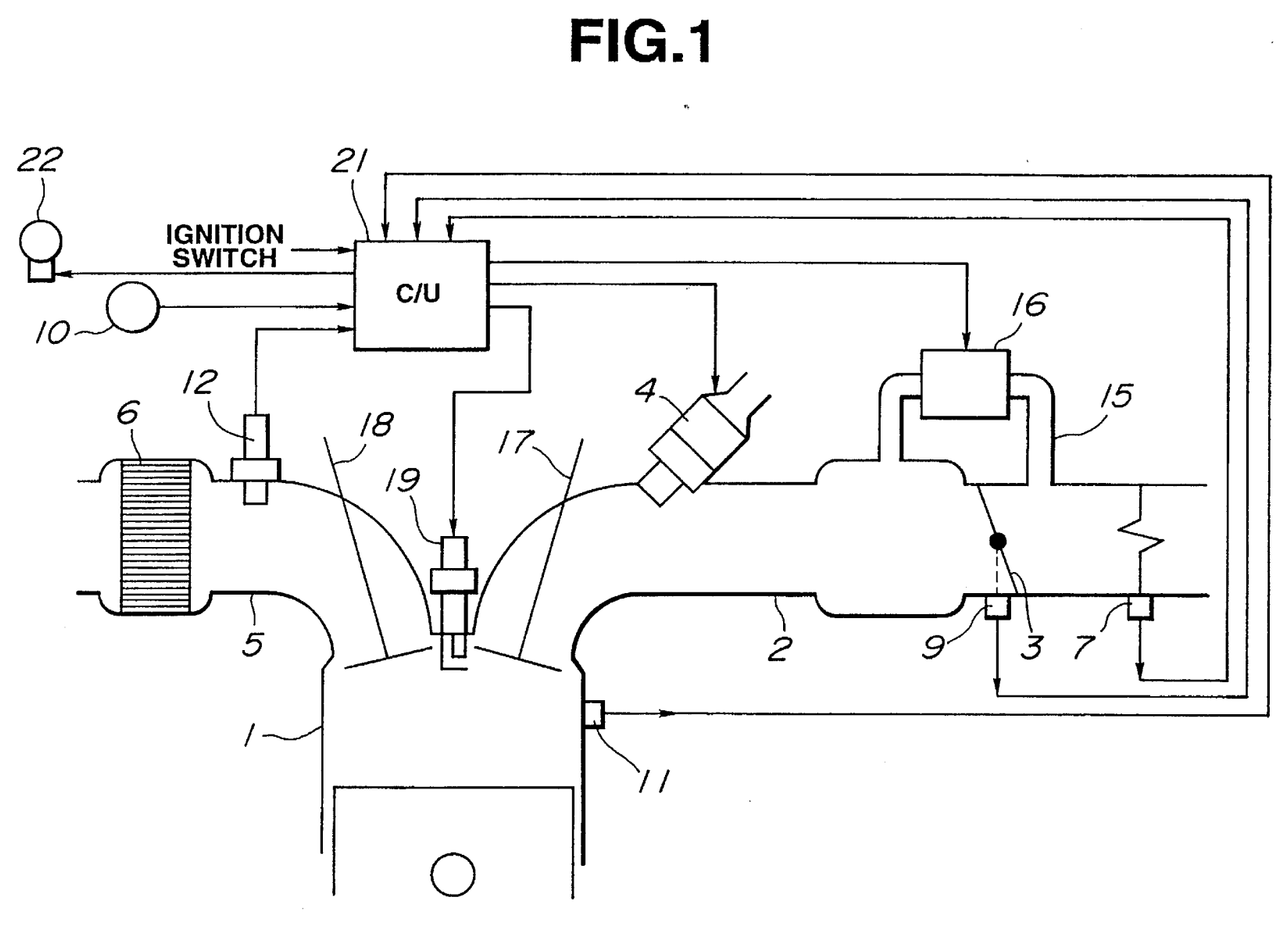
FIG. 1 is a diagrammatic view showing a preferred embodiment of a diagnostic system for an idle speed control valve according to the present invention.

Referring first to FIG. 1, an engine 1 is constructed so that intake air is led into cylinders of the engine 1 through an intake passage 2, and fuel is injected into and supplied to the engine 1. Gas burned in the cylinders is discharged through a catalyst 6 disposed within an exhaust passage 5. In FIG. 1, reference numeral 17 designates an intake valve, 18 designates an exhaust valve, and 19 designates a sparking plug.

Arranged within the intake passage 2 is an intake throttle valve 8 which is rotated with operation of an accelerator pedal (not shown) so as to adjust an amount of intake air of the engine 1.

An auxiliary air passage 15 for auxiliary air is connected to the intake passage 2 so as to bypass the throttle valve 3, An idle speed control valve 16 is arranged in the middle of the auxiliary air passage 15, and driven by a stepper motor (not shown).

An airflow meter 7, as a means for detecting an intake air amount QA to be adjusted by the throttle valve 8 and the idle speed control valve 16, is arranged within the intake passage 8.

A control unit 21 is provided to adjust the opening degree of the idle speed control valve 16 in accordance with operating conditions. Basically, the opening degree of the idle speed control valve 16 is controlled in a feedback way to make the idle speed correspond to a target value, thus adjusting an amount of idle air in accordance with an engine load upon idling.

For that purpose, the control unit 21 inputs detected signals derived from an idle switch 9 of the throttle valve 3 or idle operation detecting means, an ignition switch for detecting start of the engine 1, a crank angle sensor 10 for detecting the engine speed, a coolant temperature sensor 11 for detecting the temperature of engine coolant, and an air conditioner switch for detecting an engine load, a shift position signal out of an automatic transmission, etc.

The control unit 21 stores target idle speeds in various idle operation conditions, i.e., target speeds in different shift positions of the automatic transmission, target speeds when an air conditioner operates, and target speeds in accordance with the temperature of engine coolant. A target opening degree of the idle speed control valve 16 is corrected by a predetermined amount according to each condition, and controlled in a feedback way so that the actual engine speed corresponds to a target value.

If the idle speed control valve 16 breaks down, the idle speed is reduced to cause unstable operability of the engine 1, or inversely the idle speed is increased to cause deteriorated fuel consumption, etc. Thus, there arises a request for the abnormality diagnosis of the idle speed control valve 16.

In response to this, the present invention is constructed to change the opening degree of the idle speed control valve 16 in the diagnostic area wherein predetermined diagnosis permission conditions are established, and determine that the idle speed control valve 16 is abnormal when no variation in the intake air amount QA is found with a variation in the opening degree of the idle speed control valve 16. An alarm lamp 22 is arranged to give a warning when determining abnormality of the idle speed control valve 16.

Figure 2:
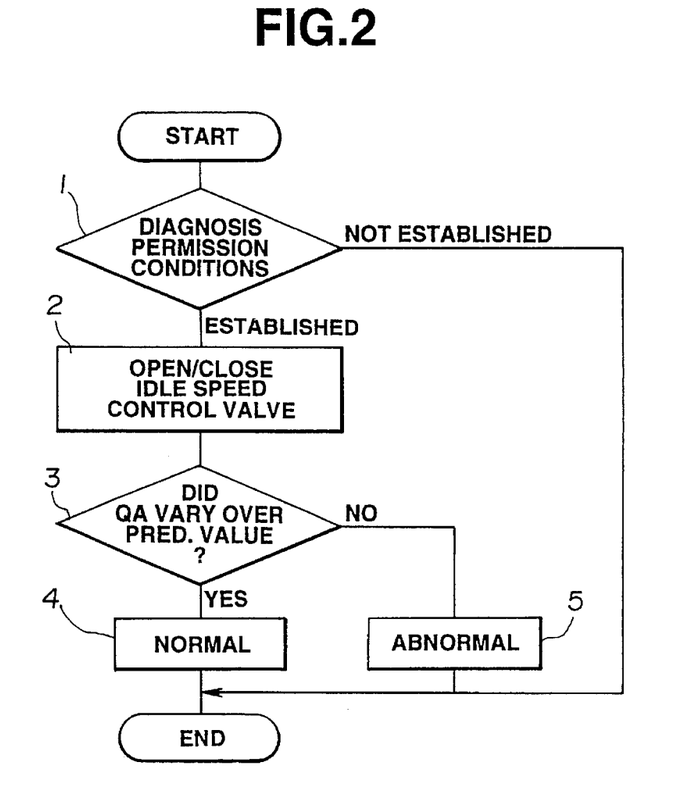
FIG. 2 is a flowchart showing the diagnosis of the idle speed control valve.

Referring to FIG. 2, the abnormality diagnosis of the idle speed control valve 16 will be described. This routine is executed once per operation, First, at a step 1, it is determined whether or not different diagnosis permission conditions are established. By this, determination is made with regard to the diagnostic area wherein the operating state of the engine 1 is stabilized.

If the diagnosis permission conditions are established, the flow proceeds to a step 2 where the idle speed control valve 16 is opened and closed. Specifically, as shown in FIG. 3, the opening degree of the idle speed control valve 16 is increased and decreased from a target idle speed in a predetermined period of time and at a predetermined rate of change.

At a step 3, it is determined whether or not a variation in the intake air amount QA produced upon opening and closing operation of the idle speed control valve 16 is greater than a predetermined value.

Figure 3:
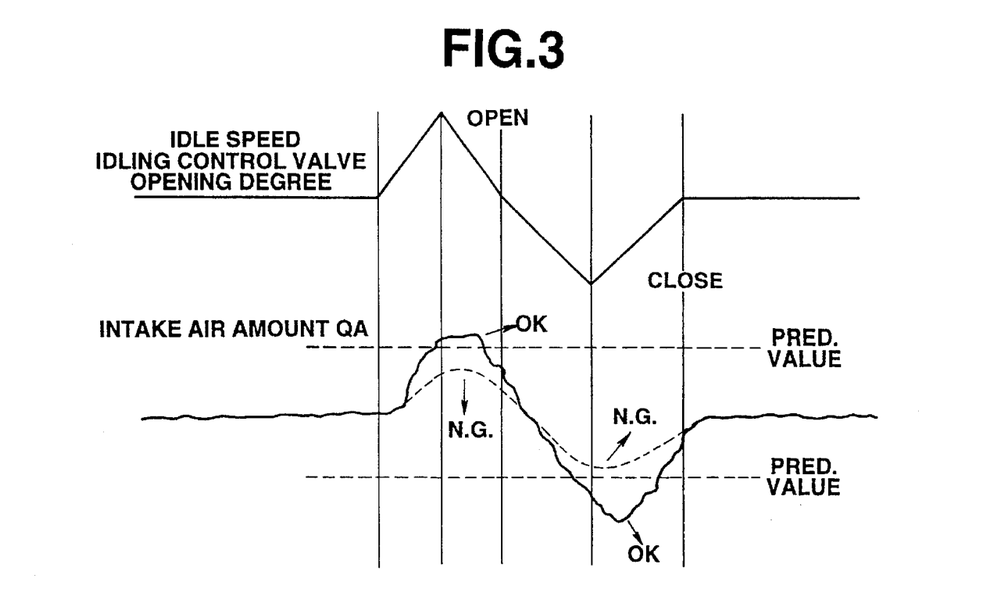
FIG. 3 is a graphical representation showing a characteristic of the opening degree of the idle speed control valve during the diagnosis and a variation in the intake air amount.

Referring to FIG. 3, when the intake air amount QA is increased and decreased over the predetermined value as indicated by a fully drawn line, the flow proceeds to a step 4 where it is determined that the idle speed control valve 16 is normal. On the other hand, when the intake air amount QA is increased and decreased within the predetermined value as indicated by a broken line, for example, the flow proceeds to a step 5 where it is determined that the idle speed control valve 16 breaks down, and the alarm lamp 22 is turned on.

In such a way, abnormality of the idle speed control valve 16 can correctly be determined by detecting a variation in the intake air amount QA produced upon opening and closing operation of the idle speed control valve 16.

It is to be noted that when interrupting feedback control of the engine speed to carry out forced opening and closing operation of the idle speed control valve 16, the operation stability, etc. of the engine 1 can be deteriorated.

In opposition to this, the present invention is so constructed that the stage 1 diagnosis is carried out which is performed in accordance with a command value output to the idle speed control valve 16 during normal operation, and that only if the stage 1 diagnosis determines that the idle speed control valve 16 is abnormal, the stage 2 diagnosis is carried out which interrupts feedback control of the engine speed so as to forcibly open and close the idle speed control valve 16.

Moreover, for the abnormality diagnosis of the idle speed control valve 16, the stage 2 diagnosis is carried out three times in changing the intake air amount QA largely and stepwise.

Figure 4:
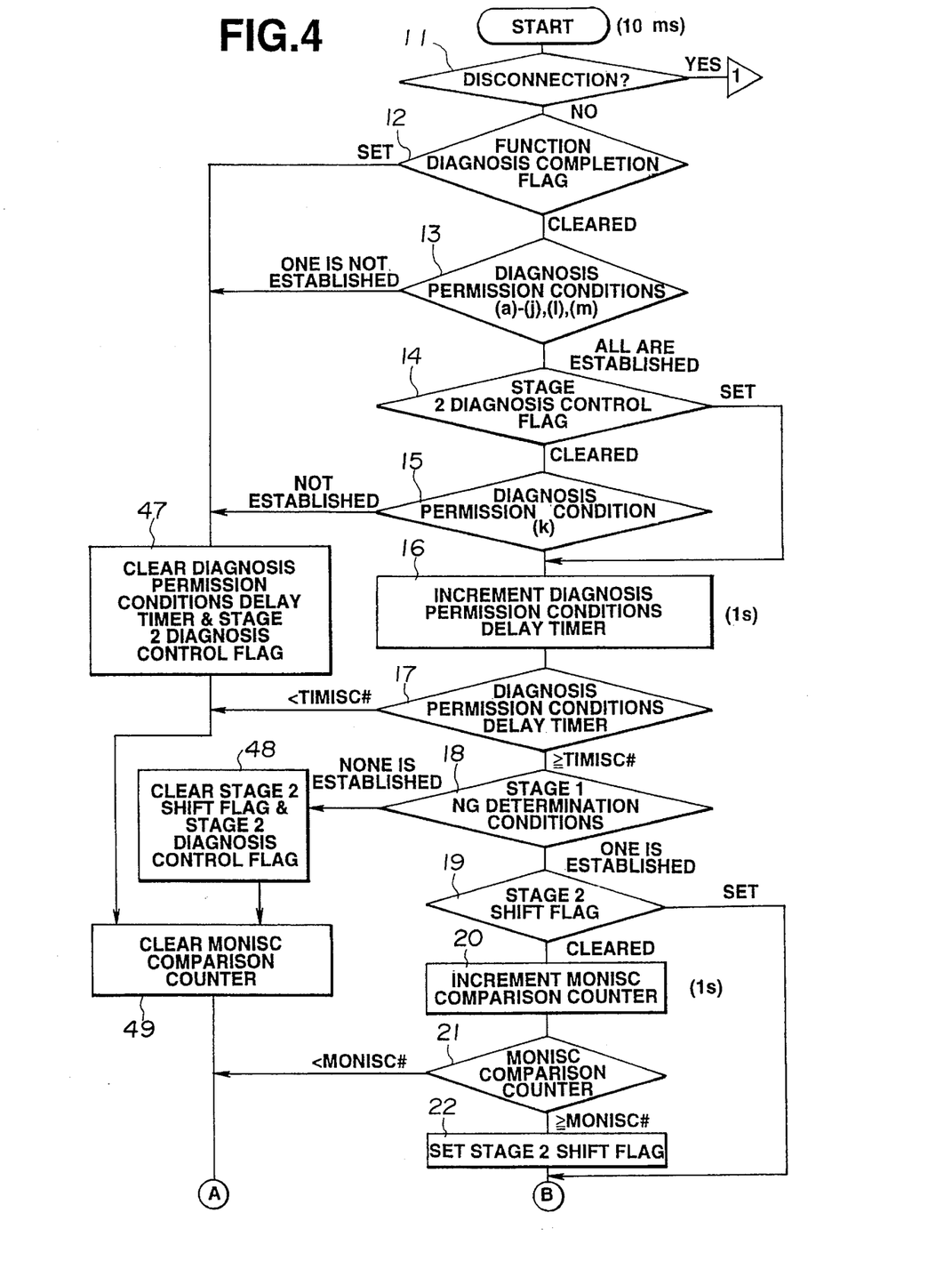
FIG. 4 is a view similar to FIG. 2, showing a detail of the diagnosis of the idle speed control valve.
Figure 5:
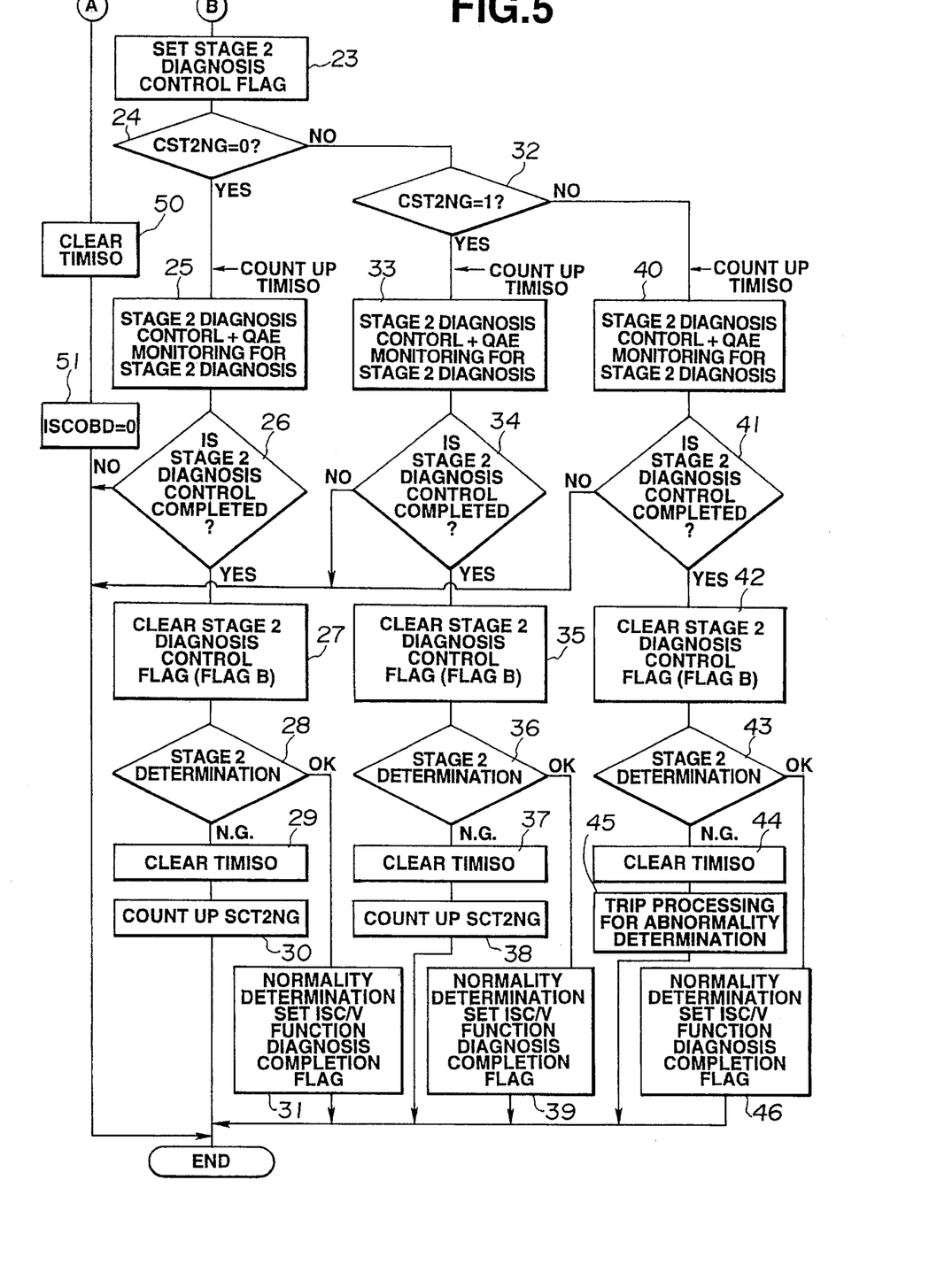
FIG. 5 is a view similar to FIG. 4, showing a detail of the diagnosis of the idle speed control valve.

Referring to FIGS. 4 and 5, the abnormality diagnosis of the idle speed control valve 16 will be described in detail. This routine is executed every predetermined period of time, for example, 10 msec.

First, at a step 11, it is determined whether or not disconnection of the idle speed control valve 16 is found in accordance with a flag indicative of a diagnostic result of disconnection of the idle speed control valve 16 which is determined in another routine. If the flag is indicative that the idle speed control valve 16 is normal, the flow proceeds to the routine at a step 12 and the followings for determining the diagnosis permission conditions. On the other hand, if the flag is indicative that disconnection of the idle speed control valve 16 is found, the flow proceeds to a step 45 where it is determined that the idle speed control valve 16 is abnormal.

As to determination of the diagnostic area, if, at the step 12, a flag indicative of function diagnosis completion as will be described later is cleared, the flow proceeds to steps 13, 15 where it is determined whether or not the diagnosis permission conditions (a)–(m) are established:

(a)—When a flag indicative of self-diagnosis selection is 1, the diagnosis is carried out;

(b)—When a starter switch is turned on, the diagnosis is prohibited since the engine speed is not constant;

(c)—When the coolant temperature is low upon starting the diagnosis is prohibited in view of possible freezing within the auxiliary air passage 15, etc.;

(d)—The diagnosis is carried out in the idle operation area wherein rotational variations are less, and in the range of the coolant temperature wherein a target idle speed is constant;

(e)—If battery voltage is smaller than a reference value, the diagnosis is prohibited;

(f)—When the outside air temperature is greater than a reference value, the diagnosis is prohibited since the stable idle operation state is difficult to maintain due to the low density of intake air;

(g)—The diagnosis is carried out during feedback control of the idle speed control valve 16;

(h)—The diagnosis is prohibited during adjustment of the idle switch 9;

(i)—The diagnosis is prohibited when the idle speed control valve 16 undergoes an output correction;

(k)—The diagnosis is prohibited when the engine speed varies;

(j)—The diagnosis is prohibited when determining abnormality of the other sensors used for the diagnosis permission conditions;

(l)—The diagnosis is prohibited when a feedback control amount of the idle speed control valve 16 is greater than a predetermined value;

(m)—The diagnosis is carried out when the vehicular speed is zero.

If these diagnosis permission conditions are all established, the flow proceeds to the routine at a step 16 and the followings for carrying out the stage 1 diagnosis.

The stage 1 diagnosis is carried out through the steps 16 and 17 until it is determined that a predetermined period of time TIMISC# has elapsed from start of the diagnosis.

Figure 6A:
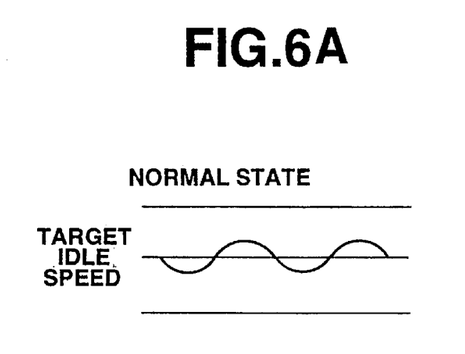
FIGS. 6A and 6B are view similar to FIG. 3, showing a variation in a command value output to the idle speed control valve.
Figure 6B:
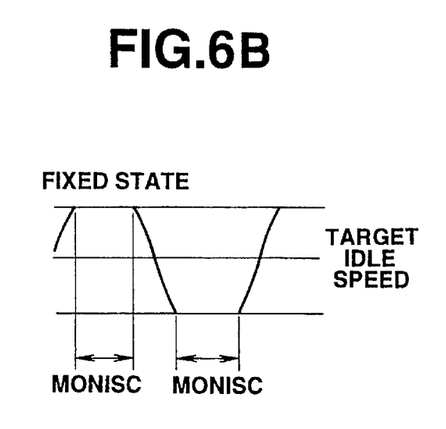

Referring to FIGS. 6A and 6B, if, in the operating state wherein a control value ISC output to the idle speed control valve 16 is controlled in a feedback way to approach a target idle speed as illustrated in FIG. 6A, it is determined that a period of time MONISC held by a limiter having upper and lower limits as illustrated in FIG. 6B exceeds a predetermined value MONISC#, the stage 1 diagnosis determines that the idle speed control valve 16 is abnormal, setting a flag indicative of shift to a stage 2 (steps 18–22).

On the other hand, if the diagnosis permission conditions are not established, or the stage diagnosis determines that no abnormality of the idle speed control valve 16 is found, all set values are cleared (steps 47–51).

As to the stage 2 diagnosis, a flag indicative of control of the stage 2 diagnosis is set at a step 23, and if it is determined at a subsequent step 24 that this is the first stage 2 diagnosis, the flow proceeds to a step 25 where the first stage 2 diagnosis is carried out (ISCOBD=1).

Figure 7:
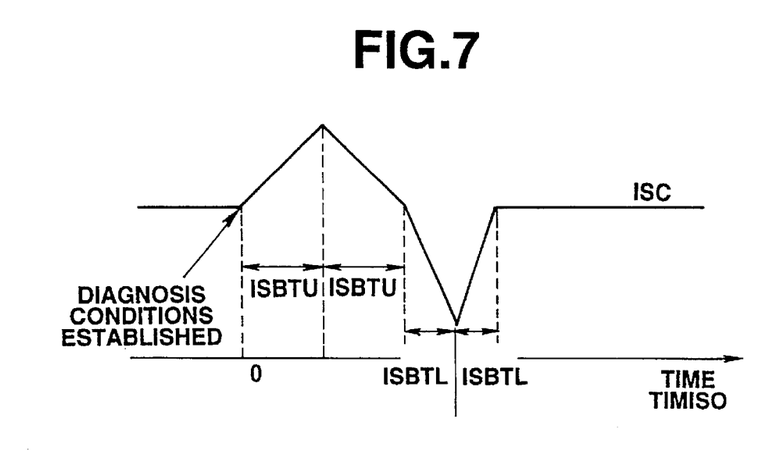
FIG. 7 is a view similar to FIGS. 6A and 6B, showing a characteristic of the opening degree of the idle speed control valve during the diagnosis.

Referring to FIG. 7, the stage 2 diagnosis controls a control value ISC output to the idle speed control valve 16 such that the opening degree of the idle speed control valve 16 is increased and decreased at a predetermined rate of change during a predetermined period of time ISBTU, then at a predetermined rate of change during a predetermined period of time ISBTL, and stores a detected value QAE of the intake air amount QA derived from the airflow meter 7.

At a step 26, if it is determined that control of forced opening and closing of the idle speed control valve 16 is completed, the flow proceeds to a step 28 through a step 27, where it is determined whether or not the detected value QAE of the intake air amount QA derived from the airflow meter 7 is increased and decreased over a predetermined value. If the answer at the step 28 is YES, the flow proceeds to a step 31 where it is determined that the idle speed control valve 16 is normal, setting a flag indicative of function diagnosis completion.

On the other hand, at the step 28, if it is determined that the detected value QAE of the intake air amount QA derived from the airflow meter 7 is not increased and decreased over a predetermined value, i.e., a variation in the intake air amount QA is small, the flow proceeds to a step 29 where the first stage 2 diagnosis determines that the idle speed control valve 16 is abnormal, and a timer value TIMISO is cleared. At a subsequent step 30, the first stage 2 diagnosis is completed, and a flag CST2NG indicative of execution of the second stage 2 diagnosis is set to 1.

It is to be noted that when the stage 2 diagnosis is carried out in the routine at the steps 13–15 for determining the diagnosis permission conditions, the flow proceeds to the step 16 through the step 14 in bypassing the step 15 where the diagnosis is prohibited when the engine speed varies.

In such a way, if the first stage 2 diagnosis determines that the idle speed control valve 16 is abnormal, the second stage 2 diagnosis is carried out at steps 32–36.

At the step 33, the control value ISC output to the idle speed control valve 16 operates to enlarge a rate of change of the opening degree of the idle speed control valve 16, and lengthen the periods of time ISBTU, ISBTL for increasing and decreasing the opening degree of the idle speed control valve 16 as shown in FIG. 7, producing a larger change of the opening degree of the idle speed control valve 16 than upon the first stage 2 diagnosis (ISCOBD=2).

At the step 34, if it is determined that control of forced opening and closing of the idle speed control valve 16 is completed, the flow proceeds to the step 36 through the step 35, where it is determined whether or not the detected value QAE of the intake air amount QA derived from the airflow meter 7 is increased and decreased over a predetermined value. If the answer at the step 36 is YES, the flow proceeds to a step 39 where it is determined that the idle speed control valve 16 is normal, setting the flag indicative of function diagnosis completion.

On the other hand, at the step 86, if it is determined that the detected value QAE of the intake air amount QA derived from the airflow meter 7 is not increased and decreased over a predetermined value, the second stage 2 diagnosis determines that the idle speed control valve 16 is abnormal, so that at a step 37, the timer value TIMISO is cleared. At a subsequent step 38, the second stage 2 diagnosis is completed, and a flag CST2NG indicative of execution of the third stage 2 diagnosis is set to 2.

In such a way, if the second stage 2 diagnosis determines that the idle speed control valve 16 is abnormal, the third stage 2 diagnosis is carried out at steps 40–43.

At the step 40, the control value ISC output to the idle speed control valve 16 operates to enlarge a rate of change of the opening degree of the idle speed control valve 16, and lengthen the periods of time ISBTU, ISBTL for increasing and decreasing the opening degree of the idle speed control valve 16 as shown in FIG. 7, producing a larger change of the opening degree of the idle speed control valve 16 than upon the second stage 2 diagnosis (ISCOBD=3).

At the step 41, if it is determined that control of forced opening and closing of the idle speed control valve 16 is completed, the flow proceeds to the step 43 through the step 42, where it is determined whether or not the detected value QAE of the intake air amount QA derived from the airflow meter 7 is increased and decreased over a predetermined value, the flow proceeds to a step 46 where it is determined that the idle speed control valve 16 is normal, setting the flag indicative of function diagnosis completion.

On the other hand, at the step 43, if the detected value QAE of the intake air amount QA derived from the airflow meter 7 is not increased and decreased over a predetermined value, the flow proceeds to a step 44 where the timer value TIMISO is cleared. At a subsequent step 45, abnormality determination of the idle speed control valve 16 is output.

The stage 2 diagnosis is carried out only when the stage 1 diagnosis to be carried out during normal operation determines that the idle speed control valve 16 is abnormal, resulting in a reduced execution frequency of the stage 2 diagnosis, restraining a deterioration of the operation stability, etc. of the engine 1.

In such a way, since the stage 2 diagnosis is constructed to determine abnormality of the idle speed control valve 16 three times in changing the intake air amount QA largely and stepwise, a variation in the opening degree of the idle speed control valve 16 by the first stage 2 diagnosis can be limited to a relatively small value.

As a result, when the first stage 2 diagnosis determines that the idle speed control valve 16 is normal, a variation in the intake air amount QA is small, restraining the operation stability, etc. of the engine 1.

Having described the present invention in connection with the preferred embodiment, it is understood that the present invention is not limited thereto, and various changes and modifications are possible without departing from the spirit of the present invention.

What is claimed is:

1. A diagnostic system for an idle speed control valve of an engine, the idle speed control valve adjusting an amount of auxiliary intake air which flows in bypassing an intake throttle valve, the diagnostic system comprising:

means for detecting an engine speed;

means for detecting an idle operation of the engine; and a microcomputer based control unit connected to the idle speed control valve, said engine speed detecting means and said idle operation detecting means, said microcomputer based control unit controlling in a feedback way an opening degree of the idle speed control valve so as to approach an idle speed of the engine to a target value, said microcomputer based control unit including:

means for determining a diagnostic area wherein diagnosis permission conditions are established;

means for forcibly producing a variation in said opening degree of the idle speed control valve in a predetermined mode in said diagnostic area determined;

means for detecting a variation in an amount of intake air with said variation in said opening degree of the idle speed control valve produced; and means for determining abnormality of the idle speed control valve when said variation in said amount of intake air detected is smaller than a predetermined value.

2. A diagnostic system for an idle speed control valve of an engine, the idle speed control valve adjusting an amount of auxiliary intake air which flows in bypassing an intake throttle valve, the diagnostic system comprising:

means for detecting an engine speed;

means for detecting an idle operation of the engine; and a microcomputer based control unit connected to the idle speed control valve, said engine speed detecting means and said idle operation detecting means, said microcomputer based control unit controlling in a feedback way an opening degree of the idle speed control valve so as to approach an idle speed of the engine to a target value, said microcomputer based control unit including:

means for determining a diagnostic area wherein diagnosis permission conditions are established;

means for forcibly producing a variation in said opening degree of the idle speed control valve in a predetermined mode in said diagnostic area determined;

means for detecting a variation in an amount of intake air with said variation in said opening degree of the idle speed control valve produced;

means for determining abnormality of the idle speed control valve when said variation in said amount of intake air detected is smaller than a predetermined value;

first means for forcibly producing said variation in said opening degree of the idle speed control valve in a first predetermined mode in said diagnostic area determined;

first means for determining abnormality of the idle speed control valve when said variation in said amount of intake air detected with said variation in said opening degree of the idle speed control valve produced by said first producing means is smaller than said predetermined value;

second means for forcibly producing said variation in said opening degree of the idle speed control valve in a second predetermined mode which is greater than said first predetermined mode when abnormality of the idle speed control valve is determined by said first determining means; and second means for determining abnormality of the idle speed control valve when said variation in said amount of intake air detected with said variation in said opening degree of the idle speed control valve produced by said second producing means is smaller than said predetermined value.

3. In an engine having an intake throttle valve:

an idle speed control valve arranged to adjust an amount of auxiliary intake air which flows in bypassing the intake throttle valve;

means for detecting an engine speed;

means for detecting an idle operation of the engine; and a microcomputer based control unit connected to said idle speed control valve, said engine speed detecting means and said idle operation detecting means, said microcomputer based control unit controlling in a feedback way an opening degree of said idle speed control valve so as to approach an idle speed of the engine to a target value, said microcomputer based control unit including:

means for determining a diagnostic area wherein diagnosis permission conditions are established;

means for forcibly producing a variation in said opening degree of said idle speed control valve in a predetermined mode in said diagnostic area determined;

means for detecting a variation in an amount of intake air with said variation in said opening degree of said idle speed control valve produced; and means for determining abnormality of said idle speed control valve when said variation in said amount of intake air detected is smaller than a predetermined value.

4. In an engine having an intake throttle valve:

an idle speed control valve arranged to adjust an amount of auxiliary intake air which flows in bypassing the intake throttle valve;

means for detecting an engine speed;

means for detecting an idle operation of the engine; and a microcomputer based control unit connected to said idle speed control valve, said engine speed detecting means and said idle operation detecting means, said microcomputer based control unit controlling in a feedback way an opening degree of said idle speed control valve so as to approach an idle speed of the engine to a target value, said microcomputer based control unit including:

means for determining a diagnostic area wherein diagnosis permission conditions are established;

means for forcibly producing a variation in said opening degree of said idle speed control valve in a predetermined mode in said diagnostic area determined;

means for detecting a variation in an amount of intake air with said variation in said opening degree of said idle speed control valve produced;

means for determining abnormality of said idle speed control valve when said variation in said amount of intake air detected is smaller than a predetermined value;

first means for forcibly producing said variation in said opening degree of said idle speed control valve in a first predetermined mode in said diagnostic area determined;

first means for determining abnormality of said idle speed control valve when said variation in said amount of intake air detected with said variation in said opening degree of said idle speed control valve produced by said first producing means is smaller than said predetermined value;

second means for forcibly producing said variation in said opening degree of said idle speed control valve in a second predetermined mode which is greater than said first predetermined mode when abnormality of said idle speed control valve is determined by said first determining means; and second means for determining abnormality of said idle speed control valve when said variation in said amount of intake air detected with said variation in said opening degree of said idle speed control valve produced by said second producing means is smaller than said predetermined value.

* * * * *